United States Patent
Ueda (10) Patent No.: US 10,476,346 B2
(45) Date of Patent: Nov. 12, 2019

(54) AIR-CONDITIONING BLOWER MOTOR UNIT

(71) Applicant: KEIHIN CORPORATION, Tokyo (JP)

(72) Inventor: Masashi Ueda, Sendai (JP)

(73) Assignee: KEIHIN CORPORATION, Tokyo (JP)

( * ) Notice: Subject to any disclaimer, the term of this patent is extended or adjusted under 35 U.S.C. 154(b) by 147 days.

(21) Appl. No.: 15/882,085

(22) Filed: Jan. 29, 2018

(65) Prior Publication Data

US 2018/0226856 A1    Aug. 9, 2018

(30) Foreign Application Priority Data

Feb. 8, 2017 (JP) ................ 2017-021104

(51) Int. Cl.
| | |
|---|---|
| *H02K 5/24* | (2006.01) |
| *H02K 1/16* | (2006.01) |
| *H02K 1/27* | (2006.01) |
| *H02K 5/16* | (2006.01) |
| *H02K 7/14* | (2006.01) |
| *H02K 11/30* | (2016.01) |
| *F24F 7/007* | (2006.01) |
| *H02K 5/22* | (2006.01) |
| *H02K 3/52* | (2006.01) |
| *H02K 5/173* | (2006.01) |
| *H02K 11/33* | (2016.01) |

(52) U.S. Cl.
CPC .............. *H02K 5/24* (2013.01); *F24F 7/007* (2013.01); *H02K 1/16* (2013.01); *H02K 1/2786* (2013.01); *H02K 3/522* (2013.01); *H02K 5/161* (2013.01); *H02K 5/1735* (2013.01); *H02K 5/225* (2013.01); *H02K 7/14* (2013.01); *H02K 11/30* (2016.01); *H02K 11/33* (2016.01); *H02K 2211/03* (2013.01)

(58) Field of Classification Search
CPC .......... H02K 5/24; H02K 11/30; H02K 11/33; H02K 1/16
USPC ...................................... 310/51, 71
See application file for complete search history.

(56) References Cited

U.S. PATENT DOCUMENTS

| | | | | |
|---|---|---|---|---|
| 6,474,114 | B1 * | 11/2002 | Ito ................. | D06F 37/304 68/140 |
| 8,952,584 | B2 * | 2/2015 | Asahi ............. | H02K 5/225 310/71 |

FOREIGN PATENT DOCUMENTS

| | | |
|---|---|---|
| JP | 2001-275328 | 10/2001 |
| JP | 2001-309600 | 11/2001 |

\* cited by examiner

*Primary Examiner* — Terrance L Kenerly
(74) *Attorney, Agent, or Firm* — Rankin, Hill & Clark LLP (57) ABSTRACT

A stator of a brushless motor is provided with stator side terminal portions. A circuit board is provided with board side terminal portions. The stator side terminal portions are connected to adjacent two of U phase electromagnetic coils, V phase electromagnetic coils and W phase electromagnetic coils. The stator side terminal portions and the board side terminal portions are electrically connected via flexible wires.

9 Claims, 4 Drawing Sheets

AIR-CONDITIONING BLOWER MOTOR UNIT

CROSS-REFERENCE TO RELATED APPLICATION

This application is based upon and claims the benefit of priority from Japanese Patent Application No. 2017-021104 filed on Feb. 8, 2017, the contents of which are incorporated herein by reference.

BACKGROUND OF THE INVENTION

Field of the Invention

The present invention relates to an air-conditioning blower motor unit that rotates a blower fan by a brushless motor.

Description of the Related Art

In a vehicle air-conditioning device, a blower fan that composes an air-conditioning blower motor unit rotates to blow air. This blower fan rotates under an action of a brushless motor. That is, the brushless motor includes a stator that includes electromagnetic coils, and a rotor that functions as a yoke and includes a rotation disk of a cup shape that holds permanent magnets. When an alternating electric current flows through the electromagnetic coils, alternating magnetic fields are formed between the electromagnetic coils and the permanent magnets. As a result, the rotor rotates, and thereby a rotation shaft held by the rotor and the blower fan attached to the rotation shaft rotate.

An output of the brushless motor and, in addition, a rotation speed of the blower fan are controlled by a control circuit arranged on a circuit board. The control circuit is provided with electronic parts such as a capacitor, a resistor and a switching element. These electronic parts are electronically connected to the electromagnetic coils that compose the brushless motor.

As disclosed in Japanese Laid-Open Patent Publication No. 2001-275328, electromagnetic coils and electronic parts are generally conducted via bus bars. According to a conventional technique disclosed in Japanese Laid-Open Patent Publication No. 2001-275328, a circuit board is attached to an inner case fixed to a predetermined position in a circuit protection case formed by an upper case and a lower case, and the bus bars are embedded in the inner case. The bus bar is provided with a U-shaped vibration absorbing structure for preventing transmission of vibrations from a stator to the circuit board when a blower fan rotates.

Japanese Laid-Open Patent Publication No. 2001-309600 proposes that lead wires for supplying the alternating electric current to electromagnetic coils that compose a stator are wound around terminals provided to insulation portions of the electromagnetic coils in a state where a predetermined tension is applied to the lead wires.

SUMMARY OF THE INVENTION

Bus bars are molded bodies having rigidity, and therefore molding itself is complicated. Further, because of rigidity, the bus bars have poor capability of absorbing vibrations. Hence, the vibrations of the stator are likely to be transmitted to the circuit board via the bus bars.

As disclosed in Japanese Laid-Open Patent Publication No. 2001-309600, using lead wires eliminates a molding operation for the bus bars. However, a technique disclosed in Japanese Laid-Open Patent Publication No. 2001-309600 relates to a mold motor, and the lead wires and a stator are covered by a mold resin. Thus, while occurrence of vibrations is suppressed, the mold resin causes problems of an increase in weight of the mold motor, and an increase in material cost. Further, because the lead wires are tense, it is difficult to absorb the vibrations caused by the mold motor.

A main object of the present invention is to provide an air-conditioning blower motor unit that can be obtained without a complicated molding operation.

Another object of the present invention is to provide an air-conditioning blower motor unit that can prevent transmission of vibrations caused at a brushless motor to a circuit board.

One embodiment of the present invention is an air-conditioning blower motor unit configured to rotate a blower fan by a brushless motor including a stator and a rotor, the stator including a U phase electromagnetic coil, a V phase electromagnetic coil and a W phase electromagnetic coil formed by winding wires, insulation members, and a stator core, the winding wires being wound around the insulation members that cover the stator core, the U phase electromagnetic coil forming a U phase, the V phase electromagnetic coil forming a V phase and the W phase electromagnetic coil forming a W phase, and the rotor holding permanent magnets and rotatable along a periphery of the stator, the brushless motor including: a metal bearing holder holding the stator and rotatably supporting a rotation shaft of the brushless motor; a circuit board provided with an electronic part configured to control the brushless motor; and a metal support disk holding the bearing holder and the circuit board at positions so that the bearing holder and the circuit board do not overlap with each other, and end surfaces of the insulation members on a side facing toward the circuit board are provided with stator side terminal portions, each of the stator side terminal portions being electrically connected to two end portions of different phases of the winding wires adjacent to each other and pulled out from the U phase electromagnetic coil, the V phase electromagnetic coil or the W phase electromagnetic coil, a board side terminal portion electrically connected to the electronic part is arranged on the circuit board, and the board side terminal portion and the stator side terminal portion are electrically connected relatively swingably via flexible wires.

That is, according to the present invention, the flexible wires are trained over the electronic parts 120 arranged on the circuit board and the stator that composes the brushless motor. Hence, when the electromagnetic coils that compose the brushless motor are energized, the rotor rotates and the stator vibrates, the flexible wires warp. As a result, the vibration propagating from the stator toward the circuit board is absorbed.

By using flexible wires, the vibrations caused by the stator are absorbed by the flexible wires. Hence, the vibrations are hardly transmitted to the circuit board and the casing. As a result, noise of the air-conditioning blower motor unit is reduced. In other words, the air-conditioning blower motor unit excellent in quietness can be obtained.

The brushless motor is a so-called outer rotor type, and the flexible wires and the stator do not need to be covered by a mold resin. Hence, a complicated molding operation is unnecessary. In addition, it is possible to avoid an increase in weight of the air-conditioning blower motor unit and an increase in the material cost.

The flexible wire can be formed from a stranded wire formed by stranding a plurality of thin wires such as copper wires. In this case, an insulation coating is not provided on the stranded wires. Therefore, it is not necessary to remove the insulation coating to electrically connect the stranded wires to the board side terminal portion or the stator side terminal portion. Consequently, the stranded wires can be easily connected to the board side terminal portion or the stator side terminal portion.

The flexible wire may be a stranded wire formed by stranding a plurality of thin wires, and further coated by an insulation coating at portions other than portions connected to the stator side terminal portion and the board side terminal portion. In this case, even when the stranded wires warp and contact the circuit board, the stranded wires and the circuit board are kept insulated.

Part of the board side terminal portion is preferably embedded in the insulating support member made of resin and coupled to the circuit board. In this case, the board side terminal portion may be insert-molded in a resin material. The insulating support member is positioned and fixed to the circuit board, so that all of a plurality (three phases) of board side terminal portions are positioned and fixed to the circuit board at a time. Thus, the board side terminal portions can be easily positioned and fixed.

To make the flexible wires and the stator side terminal portion face, for example, an insertion hole may be formed in a support disk, and the stator side terminal portion may be inserted in the insertion hole. Consequently, the stator side terminal portion can come close to the flexible wires without interfering with the support disk.

The insulating support member preferably supports the stranded wires. Consequently, it is possible to prevent the stranded wires from significantly warping more than necessary, and prevent the stranded wires from contacting the circuit board due to this warping.

Preferably, a recessed housing is formed in the insulating support member, and the stranded wire is supported in the recessed housing. Consequently, it is possible to more effectively prevent the stranded wires from significantly warping more than necessary.

The insulating support member may include a columnar portion extending from the circuit board toward the stator side terminal portion, and the columnar portion may support the stranded wires. In this case, preferably, the recessed housing is formed in the columnar portion, and the stranded wires are housed in the recessed housing. Consequently, it is possible to prevent the stranded wires from significantly warping more than necessary, and prevent the stranded wires from contacting the circuit board due to this warping.

A cutout portion cut out in a recessed shape may be formed in the circuit board, and the insulating support member may be attached along a rim of the cutout portion. The cutout portion originally has low rigidity. However, because the insulating support member is attached along the rim, the rigidity near the cutout portion improves. Consequently, the vibrations are hardly transmitted to the circuit board, making it possible to obtain an air-conditioning blower motor unit excellent in quietness.

According to the present invention, the flexible wires may be used as conductive members trained over the electronic parts arranged on the circuit board and the stator that composes the brushless motor. When the stator vibrates as the rotor that composes the brushless motor rotates, the flexible wires warp. Since this warping absorbs the vibrations propagating from the stator toward the circuit board, the vibrations are hardly transmitted to the circuit board and the casing. Consequently, it is possible to provide a suitable silent air-conditioning blower motor unit.

In this case, the flexible wires and the stator do not need to be covered by the mold resin. Consequently, it is not necessary to perform the complicated molding operation, and it is possible to avoid an increase in weight of the air-conditioning blower motor unit and an increase in material cost.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Preferred embodiments of an air-conditioning blower motor unit according to the present invention will be described below in detail with reference to the accompanying drawings. Hereinafter, "lower" and "upper" respectively correspond to a lower side (Z1 direction) and an upper side (Z2 direction) in FIG. 1. The X1 direction shown in each figure refers to the same direction, and the same applies to X2, Y1, Y2, Z1 and Z2 directions, too. The X1 direction and the X2 direction in FIG. 1 respectively correspond to the farther side and closer side of the paper. The Z1 direction and the Z2 direction in FIG. 2 respectively correspond to the closer side and the farther side of the paper.

Figure 1:
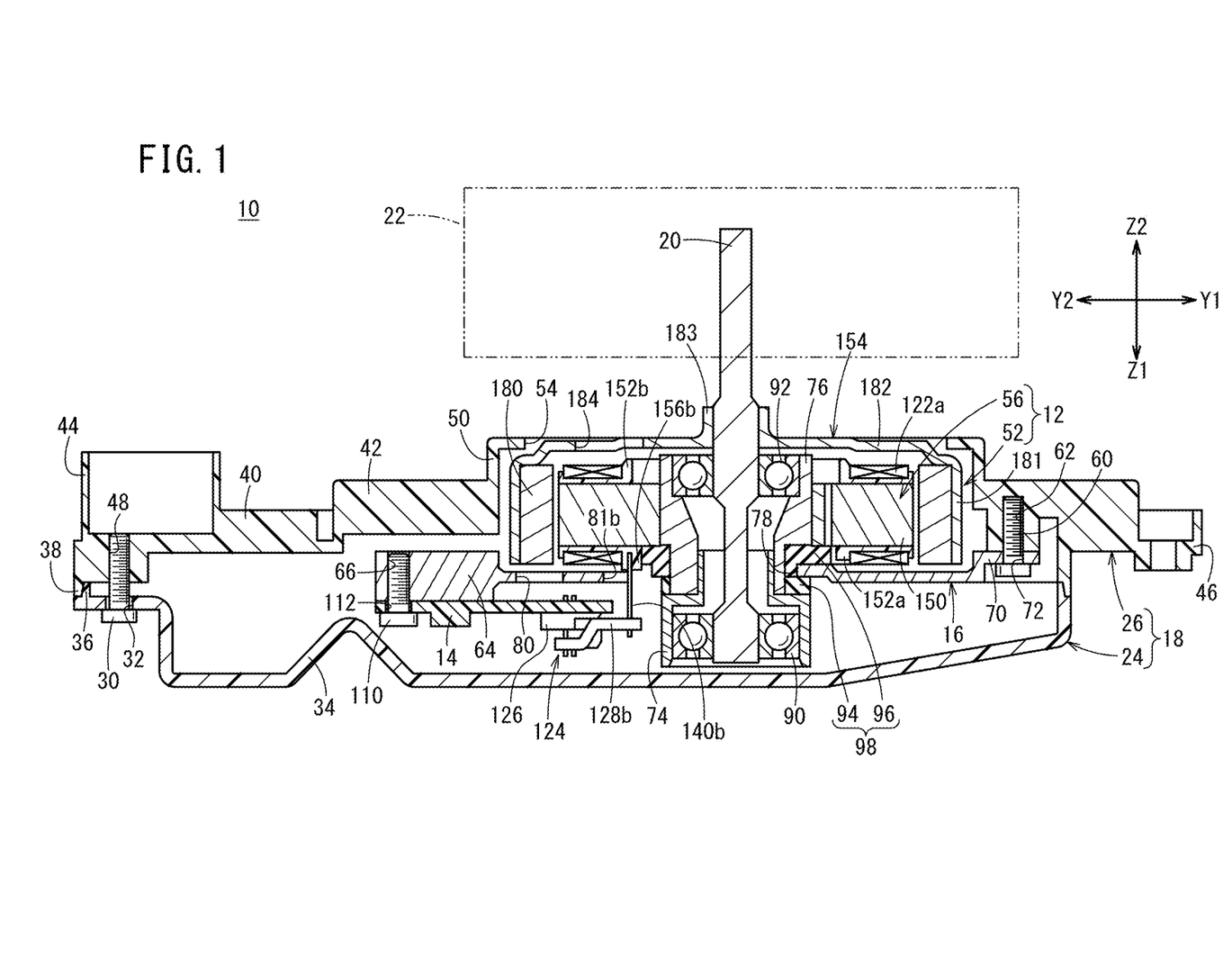
FIG. 1 is a schematic longitudinal cross-sectional view of an air-conditioning blower motor unit according to an embodiment of the present invention.

FIG. 1 is a schematic longitudinal cross-sectional view of an air-conditioning blower motor unit 10 according to the present embodiment. This air-conditioning blower motor unit 10 includes a brushless motor 12, a circuit board 14 that is provided with a control circuit that controls the brushless motor 12, a support disk 16 that supports the circuit board 14, and a casing 18 that houses these brushless motor 12, circuit board 14 and support disk 16. A blower fan 22 indicated by a virtual line is attached to a rotation shaft 20 of the brushless motor 12.

The casing 18 is formed by combining a lower half body 24 and an upper half body 26 both of which are made of resin. The lower half body 24 is a hollow body having an open side that faces toward the upper half body 26. The upper half body 26 is a hollow body having an open side that faces toward the lower half body 24. That is, the lower half body 24 forms a bottom portion, and the upper half body 26 forms a ceiling portion. Hence, the casing 18 is also formed as a hollow body. A hollow interior of the hollow body forms a passage for cooling air introduced from an air inlet 28 (see FIG. 2) formed in the upper half body 26. The cooling air is an air flow generated by the rotating blower fan 22.

A plurality of (e.g., three) coupling screw insertion holes 32 are formed in the lower half body 24 and allow insertion of coupling screws 30 that couple the lower half body 24 to the upper half body 26. FIG. 1 shows one of the coupling screw insertion holes 32. As a matter of course, the coupling screw insertion holes 32 are formed at positions at which the flow of the cooling air is not prevented. A bottom wall portion of the lower half body 24 is bent toward the upper half body 26 to form a protrusion portion 34 of a substantially reverse V shape in the lower half body 24. This protrusion portion 34 functions as a guide portion that guides the cooling air.

A thin first fitting portion 36 is formed near an outer rim portion of an upper opening of the lower half body 24, and circles along the outer rim portion. A thin second fitting portion 38 is formed in a lower opening of the upper half body 26 and circles along the outer rim. When the upper half body 26 is assembled to the lower half body 24, the second fitting portion 38 surrounds the first fitting portion 36. That is, an outer surface of the first fitting portion 36 and an inner surface of the second fitting portion 38 come into contact with each other. Thus, the lower half body 24 and the upper half body 26 fit to each other.

Figure 2:
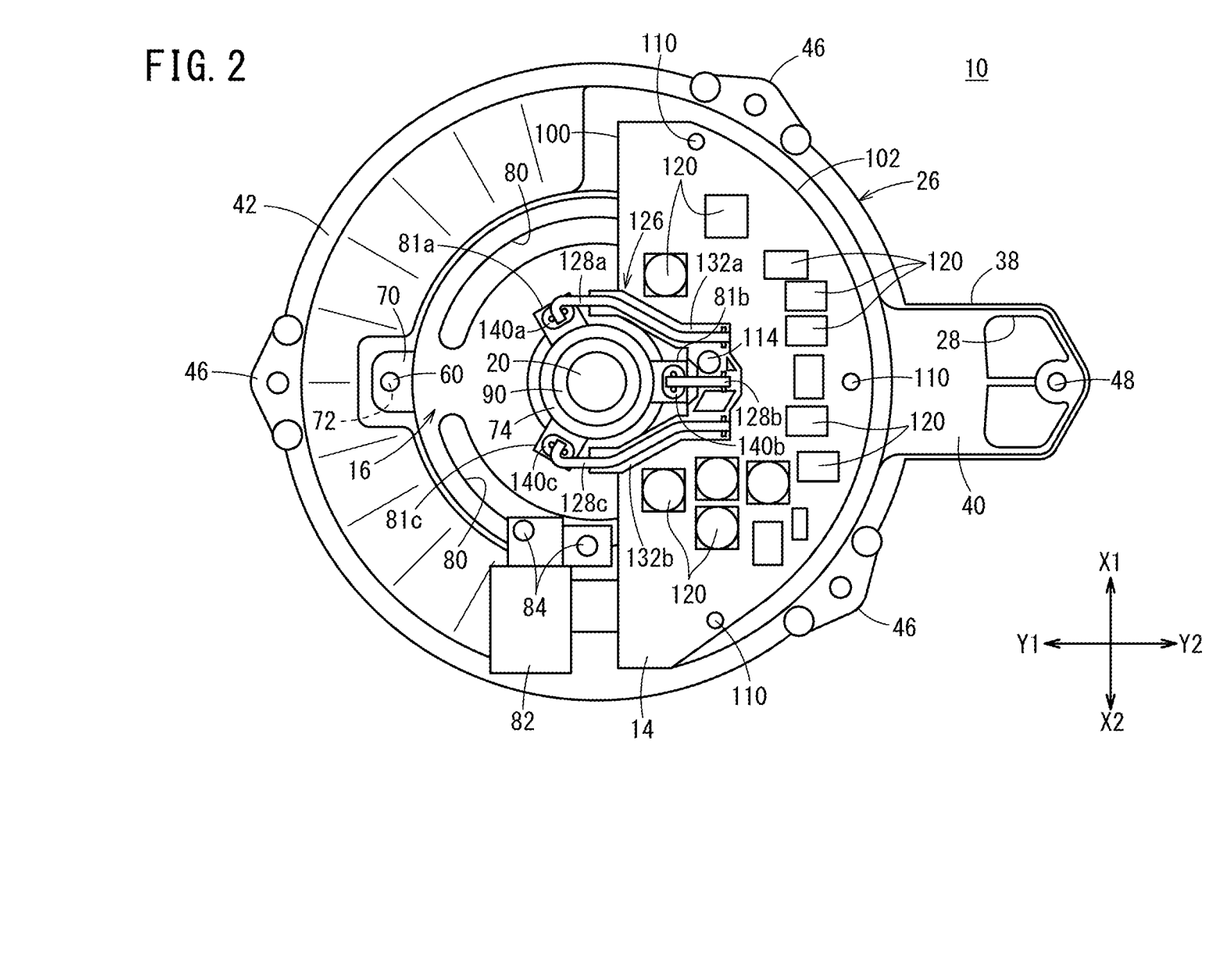
FIG. 2 is a bottom view of the air-conditioning blower motor unit shown in FIG. 1 with a lower half body of a casing omitted.

As shown in FIG. 2 that is a bottom view with the lower half body 24 omitted, the upper half body 26 includes a linear shape portion 40 having one end portion provided with the air inlet 28, and a lid portion 42 of an annular shape continuous with the linear shape portion 40. A duct 44 (see FIG. 1) is vertically arranged near the air inlet 28, and connected to a predetermined member such as a fan casing (not shown) of a so-called scroll shape surrounding the blower fan 22. Three stay portions 46 are formed at a periphery portion of the lid portion 42, and couple the air-conditioning blower motor unit 10 to the fan casing.

Coupling screw holes 48 are formed at portions facing the coupling screw insertion holes 32 in the upper half body 26. That is, the coupling screws 30 inserted in the coupling screw insertion holes 32 are screwed in the coupling screw holes 48. Thus, the lower half body 24 and the upper half body 26 are joined to form the casing 18.

An annular protrusion portion 50 is formed protruding upward at a center portion of the lid portion 42. A rotation shaft insertion opening 54 is formed at the annular protrusion portion 50 so as to surround a rotation disk 154 of a rotor 52 to be described below. The rotation shaft 20 of the brushless motor 12 is exposed through this rotation shaft insertion opening 54. Meanwhile, a stator 56 and the rotor 52 that compose the brushless motor 12, and the circuit board 14 that controls the brushless motor 12, and the support disk 16 are housed in the casing 18. Support screw holes 62 are formed in a surface (i.e., back surface) of the lid portion 42 on a side facing toward the lower half body 24, and allows support screws 60 described below to be screwed therein.

The support disk 16 is made of thin metal. Approximately half of the support disk 16 formed in a substantially disk shape is an overlap portion that overlaps the circuit board 14. A heatsink portion 64 is integrally arranged at the overlap portion. The heatsink portion 64 is a heat dissipation portion that is provided with a plurality of uprising fins (not shown) to enlarge their surface areas. That is, the heatsink portion 64 facilitates heat dissipation of the circuit board 14 transmitted to the support disk 16.

The support disk 16 is housed in the casing 18 at such a posture that a lower surface of the heatsink portion 64 faces toward the protrusion portion 34 and the fins face toward the upper half body 26. Attachment screw holes 66 are formed in the heatsink portion 64 and several (two in the present embodiment) other portions to extend from the side facing toward the lower half body 24 to the side facing toward the upper half body 26.

Three screw base portions 70 protrude from an outer rim of the support disk 16, and are disposed at positions having phase differences of approximately 120° from each other. FIG. 2 shows one of the screw base portions 70. Support screw insertion holes 72 are formed in the screw base portions 70. The support screws 60 are inserted in the support screw insertion holes 72, and attach the support disk 16 to the upper half body 26.

At a center of the support disk 16, a holding hole 78 that holds a first bearing holder 74 and a second bearing holder 76 (see FIG. 1) as bearing holders made of metal is formed, and a plurality of (e.g., three) passage holes 80 arranged in an arc shape about the holding hole 78 are formed. An unillustrated cylindrical screw portion is formed near one of the vent holes 80.

A rubber assembly 98 formed by combining a first vibration absorbing rubber member 94 and a second vibration absorbing rubber member 96 is fitted to the holding hole 78. A first cutout portion 81a, a second cutout portion 81b and a third cutout portion 81c are insertion holes through which a first stator side terminal portion 140a, a second stator side terminal portion 140b and a third stator side terminal portion 140c described below are inserted respectively are formed in the holding hole 78 with phase differences of approximately 120° from each other.

The support disk 16 configured as described above can be obtained as a casting made of aluminum alloy, for example. In this support disk 16, a coupler housing 82 in which an unillustrated wire harness provided on a vehicle side is inserted is supported by holding screws 84 screwed in the cylindrical screw portions. The coupler housing 82 is made of resin, and has an insulation property. The wire harness is electrically connected to an unillustrated conductive member whose distal end protrudes in the coupler housing 82.

The first bearing holder 74 includes a diametrically large lower end in which a first bearing 90 and an unillustrated wave washer are inserted, and an upper end that is on a side facing toward the second bearing holder 76 and is set to a smaller diameter than the lower end. The second bearing holder 76 includes the diametrically large upper end in which a second bearing 92 is press-fitted, and a lower end on a side facing toward the first bearing holder 74 and is set to a smaller diameter than the upper end. The second bearing holder 76 includes a lower end that is on a side facing toward the first bearing holder 74 and in which an upper end of the first bearing holder 74 is press-fitted.

The rubber assembly 98 is gripped and fixed by the support disk 16 due to step portions formed by different diameters of the lower end of the first bearing holder 74 and the upper end of the second bearing holder 76 as press-fitted and coupled, and is positioned in the holding hole 78. As a result, the first bearing holder 74 and the second bearing holder 76 as the bearing holders are elastically held by the support disk 16 via the rubber assembly 98.

The first bearing holder 74 and the second bearing holder 76 rotatably support the rotation shaft 20 of the brushless motor 12 via the first bearing 90 and the second bearing 92 (see FIG. 1).

The circuit board 14 has a substantially semicircular shape including a linear shape portion 100 and a curved arc portion 102, and the linear shape portion 100 faces toward the rotation shaft 20. To avoid an interference with the bearing holders elastically held by the support disk 16, a clearance portion 104 (see FIG. 3 in particular) is formed in the linear shape portion 100 as a cutout portion dented in a recessed shape toward the curved arc portion 102. Hence, the circuit board 14 does not overlap (cover) and surround the rotation shaft 20 in a plan view.

Figure 3:
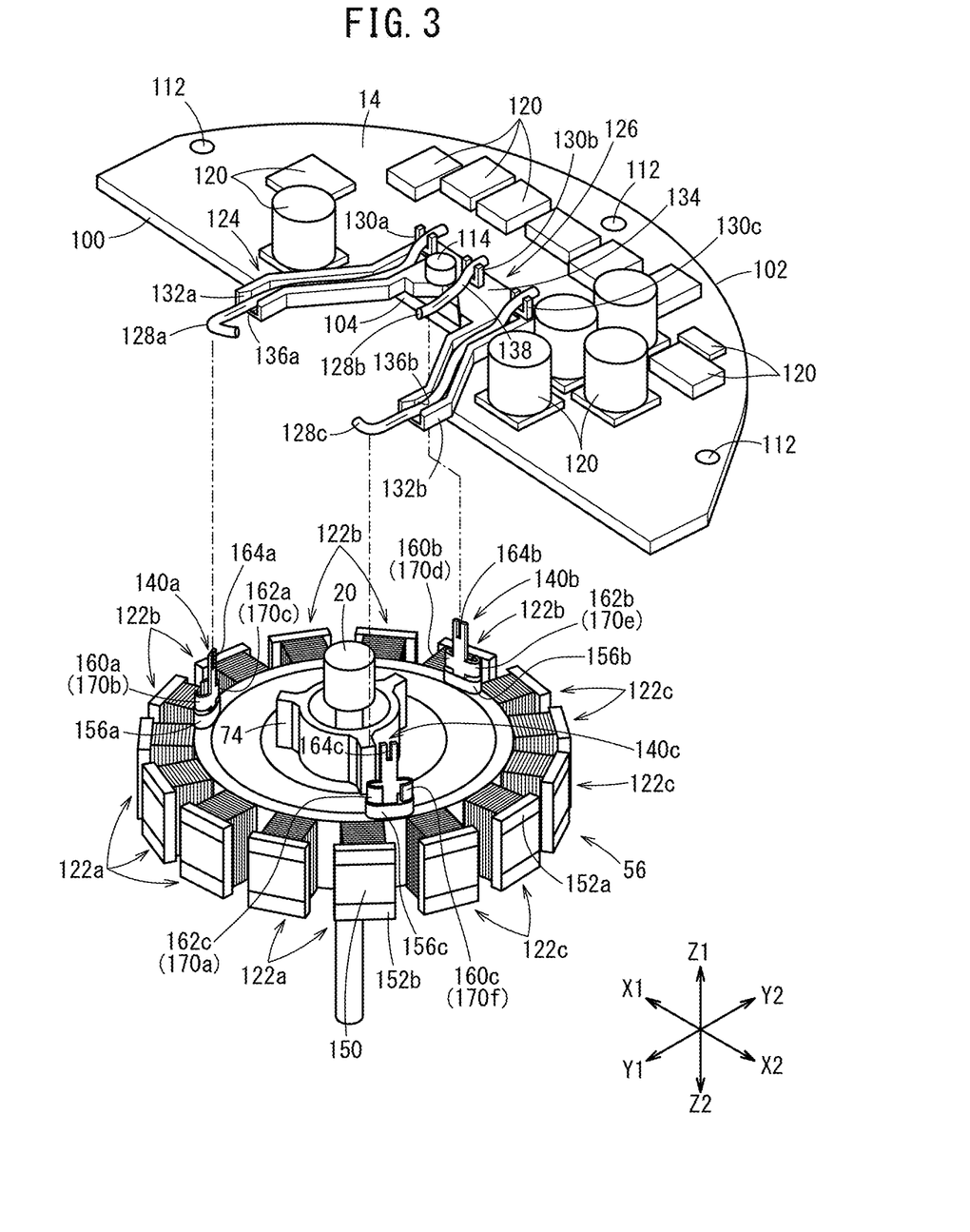
FIG. 3 is a schematic exploded perspective view showing a main part of the air-conditioning blower motor unit shown in FIG. 1 with the lower half body and an upper half body of the casing, and a support disk omitted.

That is, the bearing holders and the circuit board 14 are held by the support disk 16 at positions at which the bearing holders and the circuit board 14 do not overlap. The circuit board 14 is a sensorless control method that does not need a rotation detection sensor to control the brushless motor 12. Hence, the rotation detection sensor that detects a rotation angle state of the rotation shaft 20 does not need to be arranged near the rotation shaft 20 on the circuit board 14. Consequently, it is possible to arrange the bearing holders and the circuit board 14 distant from each other.

Three pairs of two through-holes (none of which are shown), i.e., the six through-holes, are formed near a bottom portion of the clearance portion 104 the farthest from the bearing holders. The through-holes are connected to a branch circuit formed on the circuit board 14. The two paired through-holes are positioned close to each other. Two through-holes are paired in the present embodiment, but the number of through-holes in one pair may be optionally changed according to an electric current amount required by the brushless motor 12. That is, when a design plan output of the brushless motor 12 is small and an individual load current amount of the branch circuit is small, one through-hole may be used without being combined with other through-holes. On the other hand, when the individual load current amount of the branch circuit is large for using a brushless motor 12 of a large output, three or more through-holes may form one set of through-holes.

In the circuit board 14, attachment screw insertion holes 112 (see FIG. 1) in which attachment screws 110 are inserted, and fixing screw passage holes in which fixing screws 114 described below are inserted are formed. Positions of the attachment screw insertion holes 112 correspond to positions of the attachment screw holes 66.

On the circuit board 14, various electronic parts such as a capacitor, a resistor and a switching element are arranged, and unillustrated wires form conductive paths to compose a control circuit. The control circuit controls a rotation speed of the rotation shaft 20.

The conductive member is electrically connected to the wires. The control circuit is energized (powered) via this conductive member. The conductive member is fixed to an upper side (upper surface) of the circuit board 14 by soldering or the like and protrudes from the linear shape portion 100. As described above, a protruding distal end side of the conductive member is housed in the coupler housing 82.

Power is supplied from the control circuit to U phase electromagnetic coils 122a, V phase electromagnetic coils 122b and W phase electromagnetic coils 122c of the stator 56 via a conductive assembly 124. In more detail, as shown in FIG. 3, the conductive assembly 124 is configured to include an insulating support member 126, a first stranded wire 128a, a second stranded wire 128b, a third stranded wire 128c (flexible wires), and a first board side terminal portion 130a, a second board side terminal portion 130b, a third board side terminal portion 130c. In FIG. 3, the upper half body 26 and the support disk 16 are omitted.

The insulating support member 126 is made of resin material such as polybutylene terephthalate (PBT). The insulating support member 126 includes a first columnar portion 132a and a second columnar portion 132b that are elongated and face toward each other, and a linking portion 134 that couples the first columnar portion 132a and the second columnar portion 132b. Recessed housings 136a, 136b are formed in the first columnar portion 132a and the second columnar portion 132b, respectively, and dent toward the stator 56. Hence, the first columnar portion 132a and the second columnar portion 132b have substantially U-shaped cross-sectional shapes. These first columnar portion 132a and second columnar portion 132b are bent along outer peripheries of the bearing holders in the middle of extension (see FIG. 2).

The first board side terminal portion 130a to the third board side terminal portion 130c are embedded in the linking portion 134. The first board side terminal portion 130a to the third board side terminal portion 130c have lower sides branched into two to sandwich the first stranded wire 128a to the third stranded wire 128c, and upper sides branched into two to be inserted in one pair of (two) through-holes. Fixing screw holes (not shown) are formed in the linking portion 134 and allow the fixing screws 114 to be screwed therein. Near the fixing screw hole, a U-shaped cutout 138 is formed along the second stranded wire 128b.

The first stranded wire 128a to the third stranded wire 128c are formed by a plurality of stranded thin wires (copper wires). Hence, an insulation coating is arranged on the first stranded wire 128a to the third stranded wire 128c. The first stranded wire 128a to the third stranded wire 128c have end portion sandwiched by the two branches on the lower side of the first board side terminal portion 130a to the third board side terminal portion 130c, and the other end portions sandwiched by the two branches on the lower sides of the first stator side terminal portion 140a to the third stator side terminal portion 140c (described below).

The first stranded wire 128a and the third stranded wire 128c have the substantially same length, and have a relationship of mirror symmetry. Distal ends of these first stranded wire 128a and third stranded wire 128c facing toward the stator 56 are bent toward the shaft center direction of the rotation shaft 20. The second stranded wire 128b sandwiched between the first stranded wire 128a and the third stranded wire 128c is set shorter than the first stranded wire 128a and the third stranded wire 128c.

The first stranded wire 128a and the third stranded wire 128c are housed in the recessed housings 136a, 136b formed in the first columnar portion 132a and the second columnar portion 132b, and thereby supported by the insulating support member 126. There is a difference in height between the first board side terminal portion 130a to the third board side terminal portion 130c that protrude from the linking portion 134 toward the lower half body 24, and the first stator side terminal portion 140a to the third stator side terminal portion 140c. To follow the height difference, the first stranded wire 128a, the second stranded wire 128b and the third stranded wire 128c are bent in crank shapes from the two branches on the lower sides of the first board side terminal portion 130a to the third board side terminal portion 130c toward the circuit board 14.

The attachment screw insertion holes 112 are formed in the circuit board 14 as described above. The attachment screws 110 are inserted in the attachment screw insertion holes 112, and the attachment screws 110 are screwed in the attachment screw holes 66 formed in the heatsink portion 64 (fin back surface) and two other portions. As a result of the screwing, the circuit board 14 is supported on the support disk 16. The circuit board 14 is supported indirectly by the casing 18 via the support disk 16, and is not directly coupled to the casing 18.

As shown in FIG. 1, the brushless motor 12 includes the stator 56 that is positioned and fixed to an outer circumferential wall of the second bearing holder 76, and the rotor 52 that is held by the rotation shaft 20 and integrally rotates with the rotation shaft 20. The stator 56 of these members is a member having an annular shape. The stator 56 includes a laminated core 150 (stator core) that includes a yoke portion in which the second bearing holder 76 is press-fitted, and teeth portions that are formed protruding from an outer circumference of the yoke portion radially in a direction vertical to an axial line of the rotation shaft 20. The laminated core 150 is sandwiched from above and below by one pair of insulators 152a, 152b (insolation members). The stator 56 further includes the U phase electromagnetic coils 122a, the V phase electromagnetic coils 122b and the W phase electromagnetic coils 122c wound around the teeth portions of the laminated core 150 via the insulators 152a, 152b.

The yoke portion has an annular shape at an inner circumference side of the laminated core 150. The yoke portion is positioned and fixed fast to the outer circumferential wall of the second bearing holder 76. Meanwhile, the teeth portions face toward an inner circumferential wall of a rotation disk 154 that composes the rotor 52. That is, in this case, the brushless motor 12 is a so-called outer rotor type that the rotor 52 is positioned at an outer side of the stator 56.

The adjacent teeth portions are distant from each other at predetermined intervals. That is, a clearance is formed between the teeth portions. This clearance is a path through which the cooling air passes.

The insulator 152a below the laminated core 150 facing toward the support disk 16 is provided with a first terminal embedded portion 156a, a second terminal embedded portion 156b, to a third terminal embedded portion 156c extending toward the support disk 16 and the circuit board 14. A lower end of each of the first stator side terminal portion 140a to the third stator side terminal portion 140c protrudes from each of these first terminal embedded portion 156a to third terminal embedded portion 156c toward the lower half body 24. That is, upper ends of the first stator side terminal portion 140a to the third stator side terminal portion 140c are embedded in the first terminal embedded portion 156a to the third terminal embedded portion 156c, respectively.

Each of the first stator side terminal portion 140a to the third stator side terminal portion 140c exposed from the first terminal embedded portion 156a to the third terminal embedded portion 156c includes a first hook portion and a second hook portion that are folded back in a direction to protrude from lateral sides and approach each other, and a clamp portion that is formed by branching a lower end into two. For ease of understanding, reference numerals 160a, 162a, 164a are assigned to the first hook portion, the second hook portion and the clamp portion of the first stator side terminal portion 140a. Reference numerals 160b, 162b, 164b are assigned to the first hook portion, the second hook portion and the clamp portion of the second stator side terminal portion 140b. Reference numerals 160c, 162c, 164c are assigned to the first hook portion, the second hook portion and the clamp portion of the third stator side terminal portion 140c.

There are odd numbers of (five in the present embodiment) the U phase electromagnetic coils 122a that form the U phase, the V phase electromagnetic coils 122b that form the V phase and the W phase electromagnetic coils 122c that form the W phase. Each of the U phase electromagnetic coils 122a, the V phase electromagnetic coils 122b and the W phase electromagnetic coils 122c is formed by sequentially stretching one wire to the odd numbers of the teeth portions, i.e., for example, five adjacent teeth portions along the circumferential direction. Connection portions 170a, 170b are drawn from the one of the U phase electromagnetic coils 122a located at both ends of the five U phase electromagnetic coils 122a. Similarly, connection portions 170c, 170d, and connection portions 170e, 170f are drawn one by one from the V phase electromagnetic coils 122b and the W phase electromagnetic coils 122c located at both ends of the five V phase electromagnetic coils 122b and the five W phase electromagnetic coils 122c.

The connection portions 170a, 170b are sandwiched by the second hook portion 162c of the third stator side terminal portion 140c, and the first hook portion 160a of the first stator side terminal portion 140a, respectively. The connection portions 170c, 170d are sandwiched by the second hook portion 162a of the first stator side terminal portion 140a, and the first hook portion 160b of the second stator side terminal portion 140b. The connection portions 170e, 170f are sandwiched by the second hook portion 162b of the second stator side terminal portion 140b, and the first hook portion 160c of the third stator side terminal portion 140c.

As shown in FIG. 1, the first stator side terminal portion 140a to the third stator side terminal portion 140c are inserted in the first cutout portion 81a to the third cutout portion 81c of the support disk 16, and exposed below the support disk 16. As a result of this exposure, when the circuit board 14 is held on the support disk 16, the clamp portions 164a to 164c of the first stator side terminal portion 140a to the third stator side terminal portion 140c face toward the first stranded wire 128a to the third stranded wire 128c, respectively. The first stranded wire 128a to the third stranded wire 128c are sandwiched by the clamp portions 164a to 164c in this state.

Each member is sandwiched as described above and fused (fusing), and is thereby electrically connected. That is, the connection portions 170b, 170c are electrically connected to the first stranded wire 128a via the first stator side terminal portion 140a. Similarly, the connection portions 170d, 170e are electrically connected to the second stranded wire 128b via the second stator side terminal portion 140b. The connection portions 170f, 170a are electrically connected to the third stranded wire 128c via the third stator side terminal portion 140c.

The rotor 52 includes the rotation disk 154 shown in FIG. 1. This rotation disk 154 is supported by the rotation shaft 20 rotatably inserted in the first bearing holder 74 and the second bearing holder 76. The rotation disk 154 has a bottomed cup shape including a sidewall portion 181 and a circular bottom surface 182. A plurality of permanent magnets 180 are held on an inner surface of the sidewall portion 181 formed substantially hanging down from the circular bottom surface 182, and face toward the teeth portions of the stator 56. When the rotation disk 154 rotates with the rotation shaft 20, the permanent magnets 180 also integrally rotate with the rotation disk 154.

The circular bottom surface 182 of the rotation disk 154 faces upward. The circular bottom surface 182 is exposed together with the rotation shaft 20 through the rotation shaft insertion opening 54 formed in the annular protrusion portion 50 of the upper half body 26. A predetermined clearance is formed between the annular protrusion portion 50 and the circular bottom surface 182. As is understood from FIG. 1, the sidewall portion 181 is surrounded by the rotation shaft insertion opening 54, and is not exposed to an outside of the air-conditioning blower motor unit 10.

On the circular bottom surface 182, a rotation shaft support portion 183 arranged at a center portion to allow insertion of the rotation shaft 20 provided with the blower fan 22 is arranged as an annular protrusion portion, and a plurality of vent openings 184 facing toward the teeth portions are formed. A dimension of the vent opening 184 along the circumferential direction of the circular bottom surface 182 is set to be larger from an inside to an outside in a diameter direction of the circular bottom surface 182. Hence, the vent openings 184 have substantially trapezoidal shapes whose short sides face toward the rotation shaft insertion opening 54, and whose long sides face toward an outer periphery portion of the circular bottom surface 182.

The air-conditioning blower motor unit 10 according to the present embodiment is basically configured as described above. Next, a function and an effect of the air-conditioning blower motor unit 10 will be described.

The air-conditioning blower motor unit 10 is assembled as follows. That is, first, the insulator 152a and the insulator 152b with the lower ends of the first stator side terminal portion 140a to the third stator side terminal portion 140c exposed from the first terminal embedded portion 156a to the third terminal embedded portion 156c cover the laminated core 150. Then, wires (windings) are wound around the teeth portions via the insulators 152a, 152b to form the electromagnetic coils. When winding one teeth portion is finished, the wires are stretched to the next teeth portions to wind. This winding is repeated to form the five electromagnetic coils as the U phase electromagnetic coils 122a. Similarly, the V phase electromagnetic coils 122b and the W phase electromagnetic coils 122c are formed.

The connection portions 170b of the U phase electromagnetic coils 122a and the connection portions 170c of the V phase electromagnetic coils 122b are drawn along the first terminal embedded portion 156a. Similarly, the connection portions 170d of the V phase electromagnetic coils 122b and the connection portions 170e of the W phase electromagnetic coils 122c are drawn along the second terminal embedded portion 156b. The connection portions 170f of the W phase electromagnetic coils 122c and the connection portions 170a of the U phase electromagnetic coils 122a are drawn along the third terminal embedded portion 156c.

The second bearing holder 76 is press-fitted in the inner hole of the yoke portion having the annular shape at the inner circumference side of the laminated core 150. Subsequently, the second vibration absorbing rubber member 96 is fitted over the diametrically small lower end of the second bearing holder 76. The holding hole 78 of the support disk 16 is fitted to a relatively diametrically small portion of the second vibration absorbing rubber member 96.

Subsequently, the first vibration absorbing rubber member 94 is combined with the second vibration absorbing rubber member 96. In a state where the rubber assembly 98 is fitted to the support disk 16, the diametrically small upper end of the first bearing holder 74 is press-fitted in the diametrically small lower end of the second bearing holder 76. Consequently, the bearing holders are elastically supported on the support disk 16 via the rubber assembly 98.

Next, the second bearing 92 is press-fitted in an inner hole of the second bearing holder 76, and the rotation shaft 20 that holds the rotor 52 is press-fitted in an inner hole of the second bearing 92. Subsequently, the wave washer is inserted in an inner hole of the first bearing holder 74 from below. The first bearing 90 is press-fitted in the rotation shaft 20, and the wave washer is sandwiched to insert the first bearing 90 in the inner hole of the first bearing holder 74. Thus, the brushless motor 12 in which the rotor 52 (permanent magnets 180) surrounds an outer rim of the stator 56 is composed. That is, the permanent magnets 180 that are supported on the inner surface of the sidewall portion 181 of the rotation disk 154 to compose the rotor 52 face toward the laminated core 150 of the stator 56.

Subsequently, the coupler housing 82 that composes the coupler portion is coupled to the support disk 16 protruding from the linear shape portion 100 of the circuit board 14 by screwing the holding screws 84 in the cylindrical screw portions. Thus, the coupler housing 82 is arranged on the support disk 16, and is not arranged on the circuit board 14. Hence, a sufficiently large mounting space of electronic parts 120 on the circuit board 14 is secured. Consequently, a so-called dead space is hardly provided on the circuit board 14. In addition, the coupler housing 82 does not overlap the rotation shaft 20 in the plan view.

The assembly of the brushless motor 12 and the support disk 16 obtained as described is assembled to the upper half body 26. That is, the support screws 60 are inserted in the support screw insertion holes 72 of the screw base portion 70 and are screwed to the support screw hole 62 to couple the support disk 16 to the upper half body 26. Simultaneously, the rotation shaft 20 and the circular bottom surface 182 of the rotation disk 154 are exposed through the rotation shaft insertion opening 54 of the upper half body 26.

Next, the circuit board 14 is attached to the support disk 16. That is, the attachment screws 110 inserted in the attachment screw insertion holes 112 of the circuit board 14 are screwed to the attachment screw holes 66 formed in the heatsink portion 64 (fin back surface) and two other portions. Thus, the circuit board 14 is supported on the support disk 16 via the attachment screws 110.

In addition to the above, the insulating support member 126 is subjected to injection molding or the like and coupled to the first columnar portion 132a and the second columnar portion 132b respectively having the recessed housings 136a, 136b via the linking portion 134 in which part of the first board side terminal portion 130a to the third board side terminal portion 130c are embedded. Subsequently, one end of each of the first stranded wire 128a and the third stranded wire 128c is sandwiched and fused by the first board side terminal portion 130a and the third board side terminal portion 130c. Most of the first stranded wire 128a and the third stranded wire 128c are housed in the recessed housings 136a, 136b. One end of the second stranded wire 128b is sandwiched and electrodeposited by the second board side terminal portion 130b. A substantially intermediate portion in a length direction of the second stranded wire 128b is attached to the U-shaped cutout 138. Thus, the conductive assembly 124 is formed.

Next, the conductive assembly 124 is attached to the circuit board 14. In this case, the two branches on the upper sides of the first board side terminal portion 130a to the third board side terminal portion 130c are inserted in three pairs of (six) through-holes formed in the circuit board 14. Thus, the conductive assembly 124 is positioned with respect to the circuit board 14. As a result, the conductive assembly 124 is disposed along a rim portion of the clearance portion 104, and the fixing screw passage holes and fixing screw holes are aligned. By inserting fixing screws 114 in the fixing screw passage holes to screw in the fixing screw holes, the conductive assembly 124 is attached, and positioned and fixed to the circuit board 14.

Simultaneously, distal ends of the first stranded wire 128a to the third stranded wire 128c on a side of the stator 56 are movably inserted in the clamp portions 164a to 164c. The distal ends of the first stranded wire 128a to the third stranded wire 128c, and the clamp portions 164a to 164c are respectively electrodeposited.

Thus, the electronic parts 120 mounted on the circuit board 14, and the U phase electromagnetic coils 122a, the V phase electromagnetic coils 122b and the W phase electromagnetic coils 122c are electrically connected. The circuit board 14 is indirectly supported by the upper half body 26 via the support disk 16, and is not directly coupled to the upper half body 26.

Next, the coupling screws 30 are inserted in the coupling screw insertion holes 32 formed in the lower half body 24. Moreover, the coupling screws 30 are screwed in the coupling screw holes 48 formed in the upper half body 26. Thus, the lower half body 24 and the upper half body 26 are coupled. In this case, the outer surface of the first fitting portion 36 is covered by the inner surface of the second fitting portion 38 to fit the lower half body 24 to the upper half body 26. As described above, the casing 18 that houses the assembly (the circuit board 14, the support disk 16 and the brushless motor 12) is composed.

By attaching the blower fan 22 (see FIG. 1) to the rotation shaft 20, the air-conditioning blower motor unit 10 can be obtained. The coupler housing 82 is exposed from the lower half body 24 and is located adjacent to the lower half body 24.

The circuit board 14 is at an offset position at which the circuit board 14 does not overlap the rotation shaft 20 in the plan view. Consequently, it is possible to avoid an increase in a dimension in upper and lower directions (thickness direction) of the casing 18. The coupler housing 82 (coupler portion) is adjacent to the lower half body 24, and therefore settles in the range of the thickness of the lower half body 24. Hence, it is possible to avoid an increase in size in the thickness direction of the casing 18. Hence, it is easy to miniaturize the air-conditioning blower motor unit 10.

The air-conditioning blower motor unit 10 is mounted on a vehicle body and assembled in a vehicle air-conditioning device. In this case, unillustrated assembly screws are inserted in the stay portions 46. The assembly screw is screwed to a predetermined member such as a fan casing (not shown) of a so-called scroll shape that surrounds the blower fan 22.

In this state, the wire harness on the vehicle side is inserted in the coupler housing 82, and is electrically connected to the conductive member. When the vehicle air-conditioning device is operated, the control circuit is supplied with power from the wire harness via the conductive member.

Following this power supply, the U phase electromagnetic coils 122a, the V phase electromagnetic coils 122b and the W phase electromagnetic coils 122c are enlarged, via the various electronic parts 120 such as the capacitors, the resistors, and the switching elements under control of the control circuit. As a result, the stator 56 generates an alternating magnetic field. When attraction and repulsion repeatedly occur between this alternating magnetic field, and magnetic fields of the permanent magnets 180 that compose the rotor 52, the rotation disk 154 rotates. The rotation shaft 20 and the blower fan 22 rotate integrally with this rotation.

As the power is supplied to the control circuit, the electronic parts 120 and the circuit board 14 are warmed up. This heat is transmitted to the support disk 16 and reaches the heatsink portion 64 of the support disk 16. The heatsink portion 64 is close to the circuit board 14. Consequently, the heat of the circuit board 14 quickly transmits to the heatsink portion 64.

As the blower fan 22 rotates, air around (mainly at the upper side of) the blower fan 22 is caught in the unillustrated fan casing to make an air flow toward a centrifugal direction of the blower fan 22 that is a centrifugal fan. Part of this air flow is introduced from the air inlet 28 formed in the duct 44 of the upper half body 26 to an inside of the casing 18, and becomes the cooling air that flows through in the circulation path in the casing 18.

The protrusion portion 34 is formed in the lower half body 24, and protrudes toward the upper half body 26. When the cooling air contacts the protrusion portion 34, the cooling air circulates along an inclined side portion at an upstream side. As a result, a traveling direction of the part of the cooling air is changed to a side of the upper half body 26. Thus, the protrusion portion 34 is a guide portion that guides the part of the cooling air toward the upper half body 26.

The part of the cooling air that has traveled toward the upper half body 26 contacts the heatsink portion 64. Hence, the heatsink portion 64 is quickly cooled. As described above, the heat of the circuit board 14 is quickly transmitted to the heatsink portion 64. Consequently, the heat of the circuit board 14 is efficiently dissipated via the heatsink portion 64. Thus, the protrusion portion 34 (guide portion) is formed in the casing 18 to direct the cooling air toward the heatsink portion 64, making it easy to remove the heat of the circuit board 14.

When the heatsink portion 64 is integrally formed as part of the support disk 16, the entire support disk 16 can be used as a heat dissipation member. Consequently, it is possible to increase a heat dissipation area compared to a case where the heatsink that is a different member is coupled to the support disk 16. Consequently, it is possible to miniaturize the air-conditioning blower motor unit 10, and efficiently cool the circuit board 14.

The rest of the cooling air flows over the protrusion portion 34 through the flow path in the lower half body 24 and rises toward the circuit board 14 and the stator 56. The cooling air contacts the circuit board 14, then passes the vent hole 80 of the support disk 16 and further passes a gap between the adjacent teeth portions in the circumferential direction of the stator 56. Thus, the circuit board 14, the support disk 16 and the brushless motor 12 are cooled.

The cooling air is discharged to an outside of the casing 18 via the gap between the rotation shaft insertion opening 54 of the upper half body 26 and the rotation disk 154 of the brushless motor 12, and the vent opening 184 formed in the rotation disk 154. Subsequently, the cooling air is refluxed to the air flow of the blower fan 22 (centrifugal fan).

As the rotation shaft 20 rotates, the stator 56 with the rotation shaft 20 inserted in the inner hole vibrates. These vibrations are transmitted to the first stranded wire 128a to the third stranded wire 128c via the first stator side terminal portion 140a to the third stator side terminal portion 140c.

The first stranded wire 128a to the third stranded wire 128c are the flexible wires. Hence, the first stranded wire 128a to the third stranded wire 128c easily warp as the vibrations are transmitted. The first stranded wire 128a to the third stranded wire 128c warp in this way, so that the vibrations are absorbed. As a result, the vibrations are prevented from being transmitted to the circuit board 14, the support disk 16 and the casing 18. Thus, it is possible to avoid resonance of the circuit board 14 and the casing 18 and consequently reduce noise of the air-conditioning blower motor unit 10.

Even if the vibrations are transmitted to the circuit board 14, the insulating support member 126 is coupled to the circuit board 14 by screwing via the screws 114. Consequently, rigidity of the circuit board 14 improves, so that it is possible to further reduce noise of the air-conditioning blower motor unit 10.

Portions of the first stranded wire 128a, the second stranded wire 128b and the third stranded wire 128c other than the both end portions electrodeposited on the first board side terminal portion 130a, the second board side terminal portion 130b and the third board side terminal portion 130c, and the first stator side terminal portion 140a, the second stator side terminal portion 140b and the third stator side terminal portion 140c are supported by the first columnar portion 132a, the U-shaped cutout 138 and the second columnar portion 132b of the insulating support member 126. Consequently, the first stranded wire 128a, the second stranded wire 128b and the third stranded wire 128c avoid from dropping from the first columnar portion 132a, the U-shaped cutout 138 and the second columnar portion 132b, and warp in the recessed housing 136a, the U-shaped cutout 138 and the recessed housing 136b. The first stranded wire 128a, the second stranded wire 128b and the third stranded wire 128c effectively avoid from contacting the circuit board 14, and causing short-circuiting. For the above reasons, reliability of the air-conditioning blower motor unit 10 improves.

The brushless motor 12 and the circuit board 14 are spaced at a predetermined distance from an inner wall of the casing 18 with the metal support disk 16 interposed therebetween. Therefore, even when the brushless motor 12 and the circuit board 14 vibrate or swing, an inner wall of the casing 18 avoids from interfering with the brushless motor 12 and the circuit board 14. The assembly of the circuit board 14, the support disk 16 and the brushless motor 12 is housed in the casing 18. The noise emitted from the assembly collides against the inner wall of the casing 18. Consequently, it is possible to prevent the noise from being excessively emitted to surroundings of the casing 18.

Eventually, the present embodiment can provide a compact air-conditioning blower motor unit 10 with excellent quietness. A concern about contact sounds and a concern about damages caused on the circuit board 14 are wiped away, and durability improves.

The present invention is not limited to the above embodiment in particular, and can be variously changed without departing from the scope of the present invention.

Figure 4:
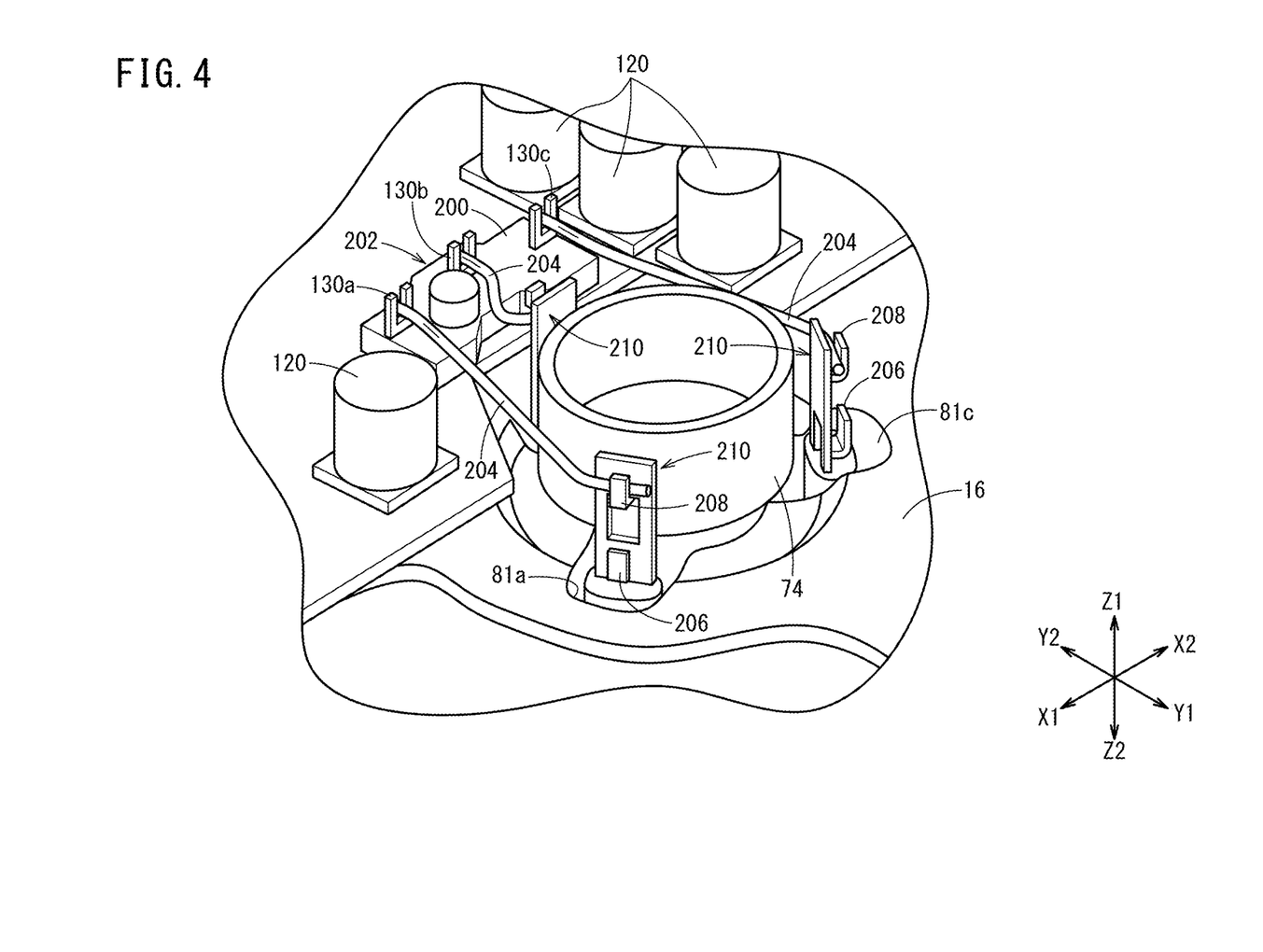
FIG. 4 is a schematic perspective view showing a main part of the air-conditioning blower motor unit according to another embodiment.

As shown in, for example, FIG. 4, an insulating support member 202 including only a terminal embedded portion 200 corresponding to the linking portion 134 may be formed without arranging the first columnar portion 132a and the second columnar portion 132b. That is, it is not indispensable to arrange the first columnar portion 132a and the second columnar portion 132b on the insulating support member 202. In this case, there is an advantage that the insulating support member 202 can employ the simple configuration, and be easily made by injection molding. FIG. 4 omits connection portions 170a to 170f.

In an embodiment shown in FIG. 4, stranded wires 204 formed by stranding a plurality of thin wires and provided with an insulation coating are trained over the first board side terminal portion 130a to the third board side terminal portion 130c and the first stator side terminal portion 140a to the third stator side terminal portion 140c. Thus, it is also possible to use the stranded wires 204 coated by the insulation coating.

As shown in FIG. 4, a stator side terminal portion 210 may include one first hook 206 holding two of the connection portions 170a to 170f together, and a second hook 208 holding the stranded wire 204.

What is claimed is:

1. An air-conditioning blower motor unit configured to rotate a blower fan by a brushless motor including a stator and a rotor, the stator including a U phase electromagnetic coil, a V phase electromagnetic coil and a W phase electromagnetic coil formed by winding wires, insulation members, and a stator core, the winding wires being wound around the insulation members that covers the stator core, the U phase electromagnetic coil forming a U phase, the V phase electromagnetic coil forming a V phase and the W phase electromagnetic coil forming a W phase, and the rotor holding a permanent magnet and rotatable along a periphery of the stator, the air-conditioning blower motor unit comprising:
 a metal bearing holder holding the stator and rotatably supporting a rotation shaft of the brushless motor;
 a circuit board provided with an electronic part configured to control the brushless motor; and
 a metal support disk holding the bearing holder and the circuit board at positions so that the bearing holder and the circuit board do not overlap, wherein:
 end surfaces of the insulation members on a side facing toward the circuit board are provided with stator side terminal portions;
 each of the stator side terminal portions electrically connected to two end portions of different phases of the winding wires adjacent to each other and pulled out from two of the U phase electromagnetic coil, the V phase electromagnetic coil or the W phase electromagnetic coil;
 a board side terminal portion electrically connected to the electronic part is arranged on the circuit board; and
 the board side terminal portion and the stator side terminal portions are electrically connected relatively swingably via flexible wires.

2. The air-conditioning blower motor unit according to claim 1, wherein the stator side terminal portions are inserted through insertion holes formed in the support disk, and the stator side terminal portions are exposed from the support disk such that the stator side terminal portions face the flexible wires.

3. The air-conditioning blower motor unit according to claim 1, wherein the flexible wires are stranded wires formed by stranding a plurality of thin wires.

4. The air-conditioning blower motor unit according to claim 3, wherein the flexible wires are covered with an insulation coating except for portions connected to the stator side terminal portion and the board side terminal portion.

5. The air-conditioning blower motor unit according to claim 3, further comprising an insulating support member made of resin, and coupled to the circuit board, part of the board side terminal portion being embedded in the insulating support member.

6. The air-conditioning blower motor unit according to claim 5, wherein the stranded wires are supported by the insulating support member.

7. The air-conditioning blower motor unit according to claim 6, wherein:
 a recessed housing is formed in the insulating support member, and
 at least one of the stranded wires is supported in the recessed housing.

8. The air-conditioning blower motor unit according to claim 7, wherein:
 the insulating support member includes a columnar portion extending from the circuit board toward one of the stator side terminal portion; and
 the recessed housing is formed in the columnar portion.

9. The air-conditioning blower motor unit according to claim 5, wherein:

a cutout portion cut out in a recessed shape is formed in the circuit board; and the insulating support member is attached along a rim portion of the cutout portion.

* * * * *